United States Patent
Azzouz et al.

(10) Patent No.: US 10,132,536 B2
(45) Date of Patent: Nov. 20, 2018

(54) CONDENSER CYLINDER ADAPTED FOR USE IN AN AIR-CONDITIONING CIRCUIT, MORE SPECIFICALLY THE AIR-CONDITIONING CIRCUIT OF AN AUTOMOBILE

(71) Applicant: Valeo Systemes Thermiques, Le Mesnil Saint Denis (FR)

(72) Inventors: Kamel Azzouz, Paris (FR); Dawid Szostek, Versailles (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/326,610

(22) PCT Filed: Jul. 16, 2015

(86) PCT No.: PCT/EP2015/066349
§ 371 (c)(1),
(2) Date: Jan. 16, 2017

(87) PCT Pub. No.: WO2016/009013
PCT Pub. Date: Jan. 21, 2016

(65) Prior Publication Data
US 2017/0211856 A1    Jul. 27, 2017

(30) Foreign Application Priority Data
Jul. 16, 2014   (FR) ..................................... 14 56823

(51) Int. Cl.
*F28D 7/10*       (2006.01)
*F25B 39/00*     (2006.01)
(Continued)

(52) U.S. Cl.
CPC ............. *F25B 39/00* (2013.01); *B60H 1/005* (2013.01); *B60H 1/3227* (2013.01); *F25B 39/04* (2013.01);
(Continued)

(58) Field of Classification Search
CPC .... F25B 39/00; F25B 39/04; F25B 2339/042; F25B 2339/044; F25B 2400/24; B60H 1/005; B60H 1/3227; B01D 5/0009
(Continued)

(56) References Cited

U.S. PATENT DOCUMENTS

| 2012/0240919 A1* | 9/2012 | Baumann ............... C09K 5/063 126/400 |
| 2013/0284400 A1 | 10/2013 | Iino et al. |
| 2014/0360706 A1* | 12/2014 | Grist .................... B01D 5/0009 165/154 |

FOREIGN PATENT DOCUMENTS

| JP | 2000-257989 A | 9/2000 |
| WO | 2014/044522 A1 | 3/2014 |

OTHER PUBLICATIONS

International Search Report issued in PCT/EP2015/066349, dated Aug. 28, 2015 (2 pages).
(Continued)

*Primary Examiner* — Davis Hwu
(74) *Attorney, Agent, or Firm* — Osha Liang LLP

(57) ABSTRACT

The invention relates to a condenser receiver adapted to receive and house a fluid used in a cold loop of an air-conditioning circuit. The condenser receiver comprises an outer wall and an inner wall which define an intermediate space, said inner wall defining an inner space for housing the fluid. The intermediate space comprises a static component adapted to store and release a given quantity of heat in order
(Continued)

to allow a heat exchange between the static component and the fluid contained in the inner space.

6 Claims, 4 Drawing Sheets

(51) Int. Cl.
    *F25B 39/04*     (2006.01)
    *B60H 1/00*     (2006.01)
    *B60H 1/32*     (2006.01)

(52) U.S. Cl.
    CPC ... *F25B 2339/042* (2013.01); *F25B 2339/044* (2013.01); *F25B 2400/24* (2013.01)

(58) Field of Classification Search
    USPC .......................................................... 165/154
    See application file for complete search history.

(56) References Cited

OTHER PUBLICATIONS

Written Opinion of the International Searching Authority issued in PCT/EP2015/066349, dated Aug. 28, 2015 (4 pages).

* cited by examiner

CONDENSER CYLINDER ADAPTED FOR USE IN AN AIR-CONDITIONING CIRCUIT, MORE SPECIFICALLY THE AIR-CONDITIONING CIRCUIT OF AN AUTOMOBILE

FIELD OF THE INVENTION

The present invention relates to a condenser cylinder used for an air-conditioning circuit, for example the air-conditioning circuit of an automobile. More specifically, the present invention relates to a condenser cylinder that makes it possible to improve the process of cooling a liquid used in the cold loop of the air-conditioning system.

STATE OF THE ART

The use of an air-conditioning system is known in the automotive industry. An air-conditioning system makes it possible to significantly improve comfort in an automobile interior. The air-conditioning system may be used in order to regulate the temperature of the automobile interior and in order to dehydrate the ambient air inside said automobile. The air-conditioning system may therefore be used in particular with the aim of preventing condensation on the insides of the windows of an automobile.

In a cold loop which is generally used in an air-conditioning system, the stages of evaporation, compression, condensation and expansion take place one after another by using a suitable fluid such as a fluid of the R134 or 1234YF type. After the condensation stage, the fluid is maintained in a liquid state inside a reservoir. This reservoir may be integrated into a condenser or may stand alone and be connected to the outlet of said condenser.

When the fluid is condensed in the condenser, said fluid circulates at the saturation temperature of said fluid towards a reservoir such as a condenser cylinder. A condenser cylinder has the function of separating the liquid and gas phases in a fluid in order to allow only the fluid to exit in its liquid state. At the same time, the condenser cylinder may be used with the aim of sub-cooling the fluid, i.e. of reducing the temperature of the fluid used in the cold loop to below the saturation temperature corresponding to the defined condensation pressure.

This process of sub-cooling is a process which is known in the prior art for a system of cooling by means of compression. The technical effect of this process lies in improving the efficiency of said system of cooling by means of compression, by virtue of a modification of the enthalpy of the fluid used in the cold loop.

According to the prior art, the condenser cylinder has a first function of maintaining the fluid used in the cold loop. Additional functionality consists, for example, in absorbing humidity by virtue of the presence of a material such as a suitable gel. The condenser cylinder may also serve to filter the fluid present in the cold thus preventing particles having a larger size than a set threshold value from circulating within the air-conditioning system.

According to the prior art, the function of sub-cooling the fluid present within a condenser cylinder is not optimal.

There appears to be a need for modifications enabling the function of sub-cooling the fluid present within a condenser cylinder to be improved in order to optimize the efficiency of the air-conditioning system.

OBJECTIVE OF THE INVENTION

The present invention relates to a condenser cylinder intended to improve the possibilities of sub-cooling the fluid present inside the cold to of an air-conditioning system.

To this end, the present invention relates to a condenser cylinder adapted receive and contain a fluid used in a cold loop an air-conditioning system, the condenser cylinder comprising an external wall and an internal wall, said external and internal walls defining an intermediate space, said internal wall defining an interior space for containing the fluid, said intermediate space comprising a static component adapted to store and release a set quantity of heat in order to allow heat exchange between the static component and the fluid contained in the interior space.

According to a mode of embodiment of the present invention, the static component comprises a phase change material (PCM).

According to a mode of embodiment of the present invention the phase change temperature of the phase change material (PCM) is between 45 and 55° C.

According to a mode of embodiment of the present invention, the static component comprises a liquid.

According to a mode of embodiment of the present invention, the static component comprises graphite.

According to a mode of embodiment of the present invention, the external wall of said condenser cylinder is provided with a plurality of ribs adapted to increase the surface a of the external wall of the condenser cylinder.

BRIEF DESCRIPTION OF THE DRAWINGS

The aims, objective and features of the present invention and also the advantages thereof will become clearer on reading the following description of preferred modes of embodiment of a condenser cylinder according to the invention, given with reference to the drawings in which.

DETAILED DESCRIPTION OF THE INVENTION

The following detailed description aims to disclose the invention in a sufficiently clear and full manner, in particular with the aid of examples, but should in no case be regarded as limiting the scope of protection to the particular mode of embodiment and examples given hereinafter.

Figure 1:
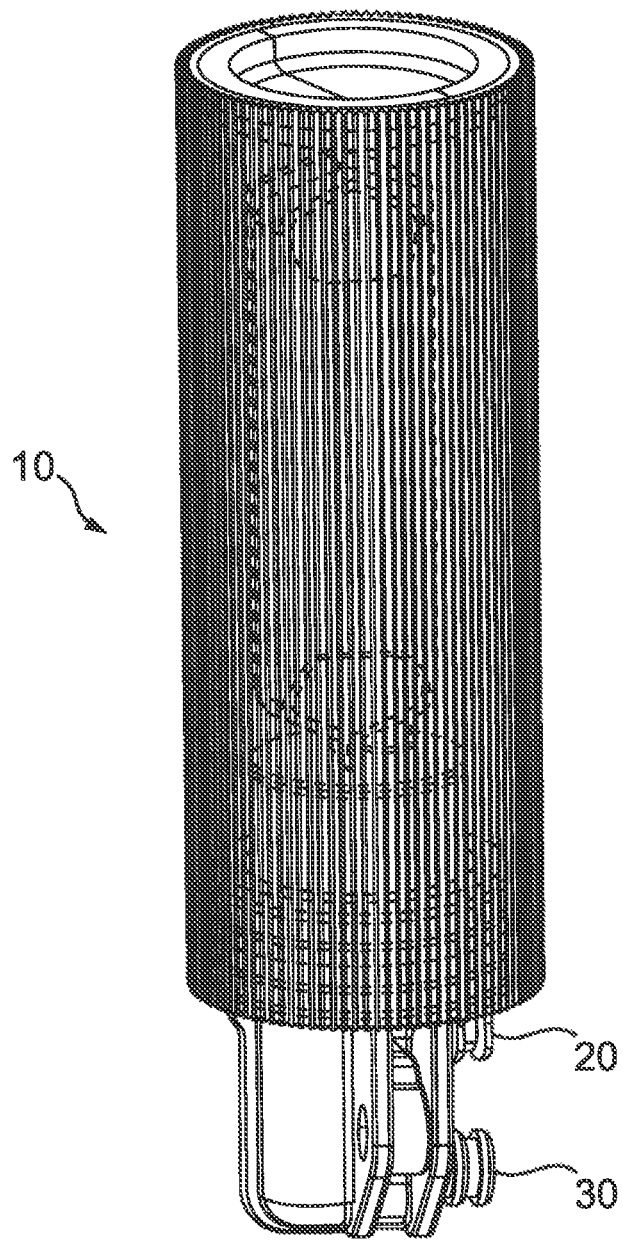
FIG. 1 shoes a view in perspective of a condenser cylinder according to the invention.

FIG. 1 shows a view in perspective of a condenser cylinder 10 according to the present invention, said cylinder being usable in combination with a condenser and being adapted to hold therein a quantity of fluid present in a cold loop such as a liquid of the R134 or 1234YF type.

In order to receive the fluid and to allow the fluid to escape, the condenser cylinder 10 is provided with an inlet 20 and an outlet 30 at a lower end thereof.

Figure 2:
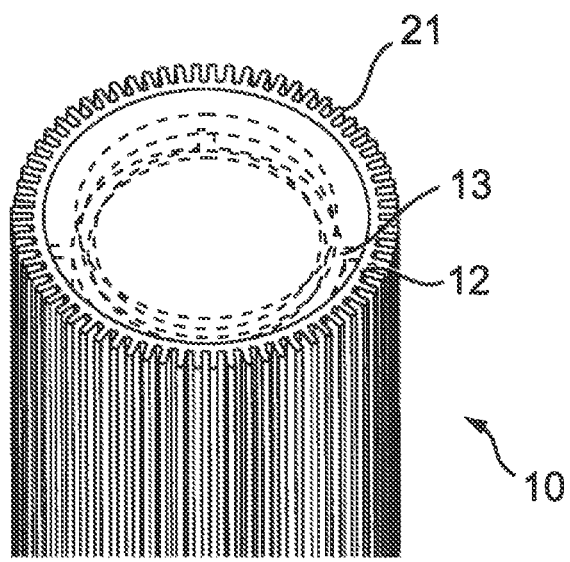
FIG. 2 shows in detail the upper end of the condenser cylinder according to FIG. 1.

FIG. 2 shows a detail of the upper end of the condenser cylinder 10 according to the invention.

As shown in FIG. 2, the condenser cylinder 10 comprises an external wall 12 and an internal wall 13. The external wall 12 of the condenser cylinder 10 is covered with a set number of ribs 21 extending in a longitudinal direction on said external surface of the external wall 12. The set formed by the ribs 21 present on the outside of the condenser cylinder 10 has the effect of increasing the surface area suitable for heat exchange with the ambient air. In other words, heat exchange with the ambient air around the condenser cylinder 10 is thus improved in comparison with heat exchange performed in accordance with the prior art with condenser cylinders having a smooth external surface.

Figure 3:
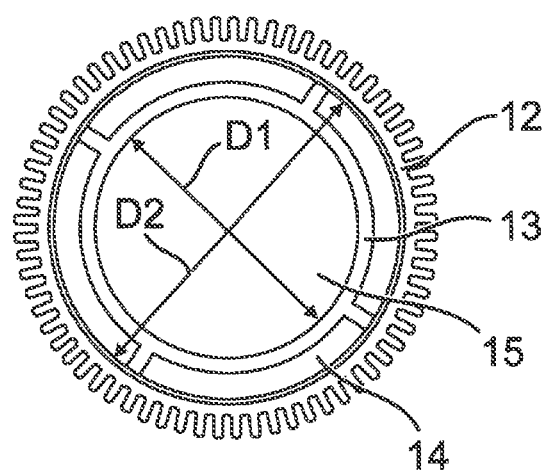
FIG. 3 shows schematically and as a view in cross section, the different elements present inside the condenser cylinder according to FIGS. 1 and 2.

FIG. 3 shows, schematically and as a view in cross section, the condenser cylinder 10 according to FIGS. 1 and 2. FIG. 3 shows the different ribs 21 visible on the outside of the external wall 12 of the condenser cylinder 10. The external wall 12 and the internal wall 13 define an intermediate space 14 situated between the external wall 12 and the interior wall 13. According to the invention, said intermediate space 14 may be used to contain a set quantity of phase change material (PCM). The volume available on the inside of the internal wall 13 defines an interior space 15 in order to receive and maintain a quantity of fluid used in the cold loop.

The presence of a set quantity of phase change material (PCM) has several technical effects. Specifically, the PCM is a material adapted to store and release a set quantity of heat. The presence of this material between the external wall 12 and the internal wall 13 of the condenser cylinder 10 may serve to stabilize the temperature of the liquid present in the interior space 15. This stability corresponds to a first positive technical effect on the efficiency of the condensing system in which the condenser cylinder 10 is used.

As shown in FIG. 2, the external wall 12 extends above the end of the internal wall 13, close to the upper end of the condenser cylinder 10. This particular feature provides the opportunity to close off the upper end of the condenser cylinder 10 with the aid of a single cap covering all of the different spaces available inside the condenser cylinder 10.

As shown in FIG. 3, the condenser cylinder 10 has an external diameter D2. The useful volume for maintaining fluid present inside the cold loop is defined using the internal diameter D1. The value of D1 is between 25 and 65 mm. The value of D2 is such that the ratio of the internal diameter D1 to the external diameter D2 preferably lies between 0 and 50%, depending on the use of the condenser cylinder 10 and stabilization of the fluid contained inside the interior space 15.

Figure 4:
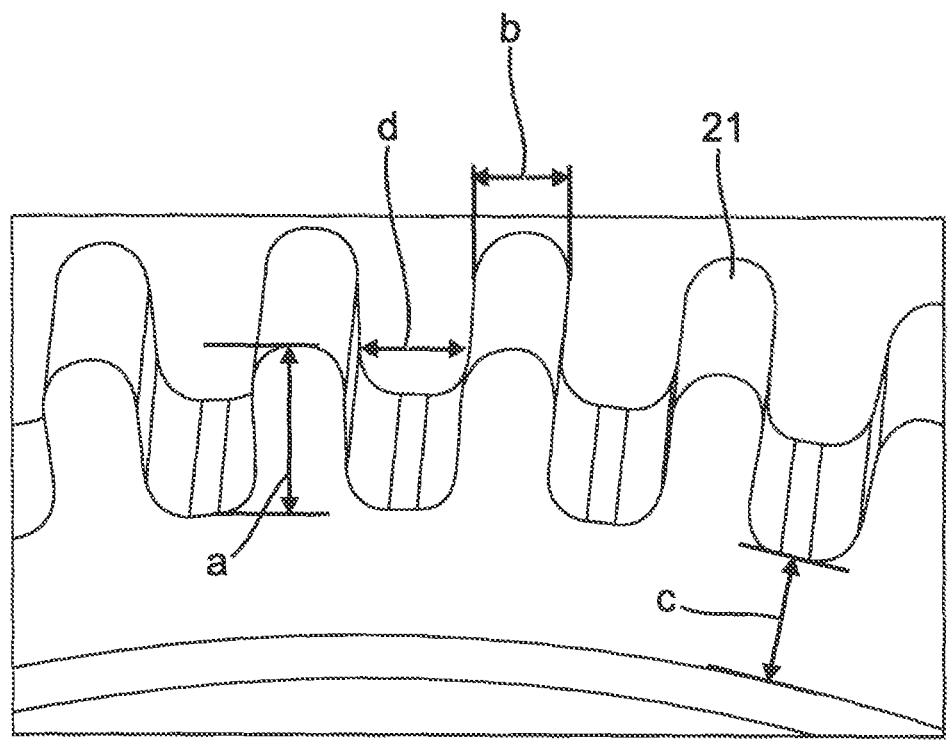
FIG. 4 shows a detail of the exterior of the condenser cylinder according to FIGS. 1 and 2.

In FIG. 4, the reference symbols "a", "b", "c" and "d" denote different characteristics in relation to the height, width and thickness, respectively, of a rib 21, and also to the gap between two ribs 21. These different dimensions "a", "b", "c" and "d" are defined according to the use to the use of the condenser cylinder 10 on which the different ribs 21 are present.

The value of the height "a" of the different ribs 21, according to FIG. 4, thus preferably lies in a range of values between 0 and 10 mm. The value of the width "b" of the ribs 21, according to FIG. 4, preferably lies in a range of values between 0 and 10 mm. The value of the thickness "c" preferably lies in a range of values between 0.8 and 4 mm, preferably between 1 and 3 mm. The value of the distance "d" between two adjacent ribs preferably lies in a range of values between 0.2 and 10 mm.

According to a preferred mode of embodiment of the present invention, the different walls as shown in cross section in FIG. 3 are obtained by means of an extrusion process. Except for the different connections intended for the condenser cylinder 10, said condenser cylinder 10 and the different caps making it possible to close off the ends are obtained by means of a single process.

According to a preferred mode of embodiment of the present invention, the upper end of the condenser cylinder 10 as shown in FIG. 2 and the lower end of the condenser cylinder 10 may be closed off by means of a cap, such as a plastic cap in combination with rings in the shape of a letter "O". Alternatively, the upper and lower ends may be closed off by means of aluminum caps in combination with rings in the shape of a letter "O". The upper and lower ends may also be closed off by means of a brazing process during which the caps are brazed to the ends of the condenser cylinder 10.

According to the present invention, the PCM used to fill the intermediate space 14 may be a PCM for which the phase change temperature is between 45 and 55° C.

The invention claimed is:

1. A condenser cylinder adapted to receive and contain a fluid used in a cold loop of an air-conditioning system, the condenser cylinder comprising:
   an external wall; and
   an internal wall,
   said external and internal walls defining an intermediate space,
   said internal wall defining an interior space for containing the fluid,
   said intermediate space comprising a static component adapted to store and release a set quantity of heat to allow heat exchange between the static component and the fluid contained in the interior space,
   wherein said external wall extends beyond an end of said internal wall toward an upper end of the condenser cylinder such that a single cap inserted from the upper end of the condenser cylinder covers both said intermediate space and said interior space.

2. The condenser cylinder as claimed in claim 1, in which the static component comprises a phase change material.

3. The condenser cylinder as claimed in claim 2, in which the phase change temperature of the phase change material is between 45 and 55° C.

4. The condenser cylinder according to claim 1, in which the static component comprises a liquid.

5. The condenser cylinder as claimed in claim 1, in which the static component comprises graphite.

6. The condenser cylinder as claimed in claim 1, in which the external wall of said condenser cylinder is provided with a plurality of ribs adapted to increase the surface area of the external wall of the condenser cylinder.

* * * * *